J. W. SCHREIBER.
Lamp-Stoves.
No. 156,503. Patented Nov. 3, 1874.
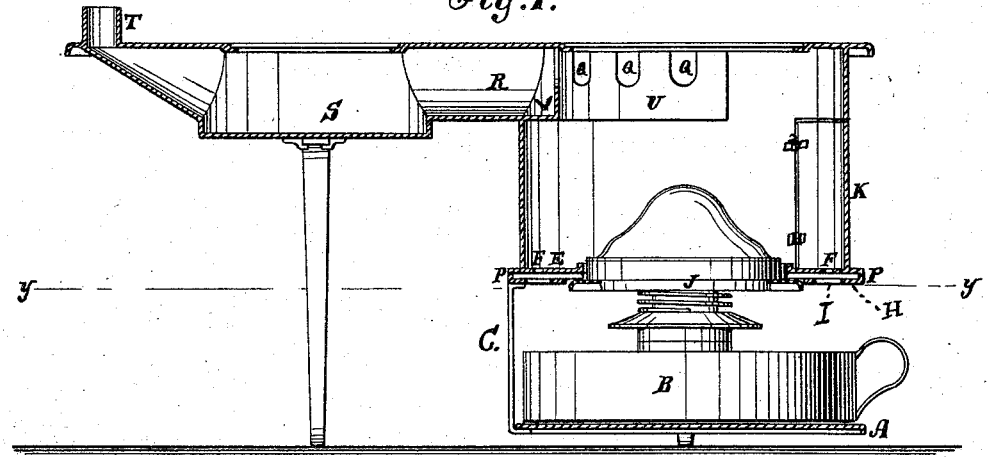
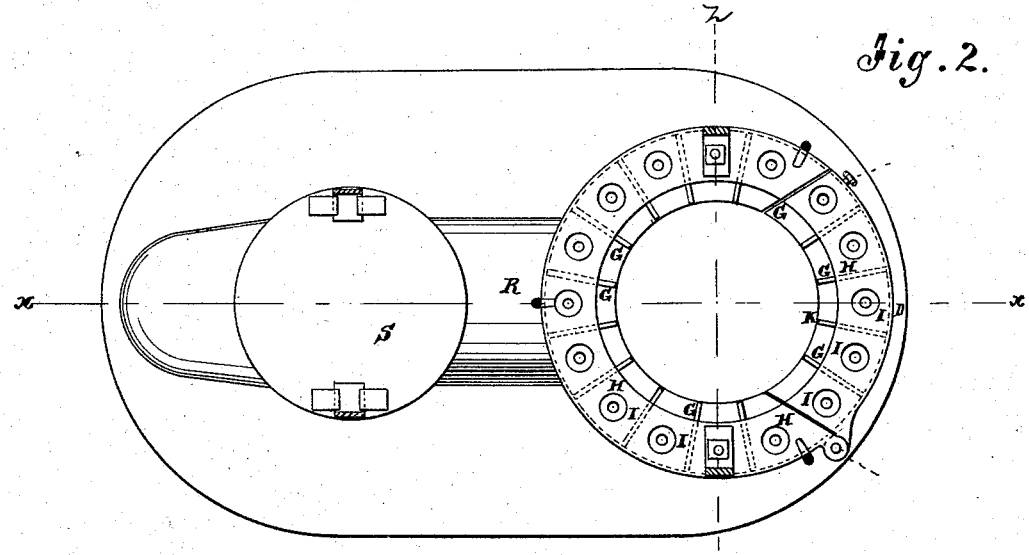
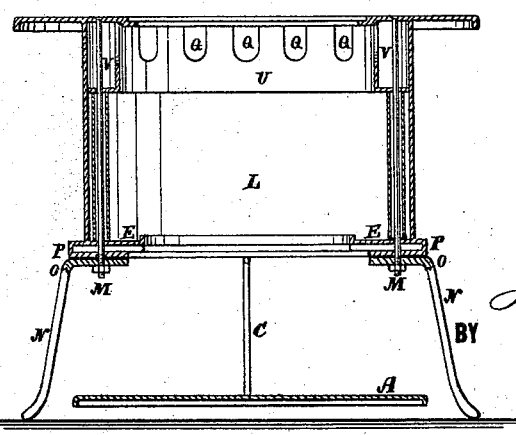
WITNESSES:
A. Bennernendorf.
A. F. Terry
INVENTOR:
J. W. Schreiber
BY
ATTORNEYS.

UNITED STATES PATENT OFFICE.

JOHN W. SCHREIBER, OF NEW YORK, N. Y.

IMPROVEMENT IN LAMP-STOVES.

Specification forming part of Letters Patent No. 156,503, dated November 3, 1874; application filed October 3, 1874.

*To all whom it may concern:*

Be it known that I, JOHN W. SCHREIBER, of the city, county, and State of New York, have invented a new and useful Improvement in Lamp-Stoves, of which the following is a specification:

This invention relates to the construction of lamp-stoves where kerosene or other oil is used; and consists in the construction of the fire-box, the lamp or burner having been already secured to me by Letters Patent of the United States.

In the accompanying drawing, Figure 1 is a vertical longitudinal section of Fig. 2, taken on the line $x$ $x$. Fig. 2 is a horizontal section of Fig. 1, looking up from the line $y$ $y$. Fig. 3 is a vertical cross-section of Fig. 2, taken on the line $z$ $z$.

Similar letters of reference indicate corresponding parts.

A is a platform, suspended by wires C from the fire-box, on which the lamp B is placed, as seen in Fig. 1. The lower portion D of the fire-box is constructed so as to supply air to the lamp-burner. For this purpose, the bottom E of the fire-box is perforated with holes F, beneath which are a series of wires, G, radiating from the center, and beneath the wires is an annular plate, H, having larger holes I, which are arranged directly below the holes in the bottom, as seen in Fig. 2. There is a space between this annular plate and the bottom equal to the diameter of the wires, through which air is furnished to the burner, the bottom of which burner consists of perforated metal through which the wick-tube J passes. The annular bottom E of the fire-box D, the wires G, and the annular plate H, are arranged in two separate parts, one part being stationary and forming the greater portion of a circle, and the other part being attached to the door K. When the door is closed the two parts form a complete circle.

The arrangement of this door forms an essential feature of my invention, as by this arrangement the lamp is slipped into its place from the side openings L instead of being introduced, as is usual, from below, and rests upon the platform A instead of being suspended by any spring attachment to the fire-box. The annular perforated plate H of the fire-box is supported by two or more long bolts or screw-rods, M, which rods also fasten the front legs N N, as seen at O O. This annular plate has a narrow flange, P, on its outer edge, which closes the space formed by the disks and prevents the air from escaping outward. The products of combustion pass from the fire-box through the apertures Q in the curved plate U and enter the flue R, and are conducted to the boiler-compartment S, and from thence to the pipe T and the chimney. The apertures Q are made through a plate, U, which projects in front of the flue R, making a space, V, between the plate and wall of the fire-box. The space is closed at the bottom but is open at each end, as seen, and is more than half the diameter of the fire-box and made to conform to the circle thereof.

Having thus described my invention, I claim as new, and desire to secure by Letters Patent—

1. The combination of the screw-rods $m$, annular plate H, and legs N, substantially as shown and described.

2. The annular perforated plate H and wires G, in combination with the perforated bottom E, substantially as and for the purposes described.

3. The plate U, with flue-apertures Q and opening V, as shown and described.

JOHN W. SCHREIBER.

Witnesses:
T. B. MOSHER,
ALEX. F. ROBERTS.